(12) United States Patent
Sugiyama et al.

(10) Patent No.: US 6,438,088 B1
(45) Date of Patent: Aug. 20, 2002

(54) LIGHT TRANSMISSION DEVICE AND APPARATUS INCLUDING LIGHT TRANSMISSION DEVICE

(75) Inventors: Toshinori Sugiyama, Tsukuba; Masanori Kadotani, Kudamatsu, both of (JP)

(73) Assignees: Hitachi Maxell, Ltd., Osaka; Hitachi, Ltd., Tokyo, both of (JP)

( * ) Notice: Subject to any disclaimer, the term of this patent is extended or adjusted under 35 U.S.C. 154(b) by 96 days.

(21) Appl. No.: 09/628,544

(22) Filed: Jul. 28, 2000

(30) Foreign Application Priority Data

Jul. 29, 1999 (JP) ............................................. 11-215315

(51) Int. Cl.[7] ................................................. G11B 7/00
(52) U.S. Cl. ............................. 369/112.01; 369/112.28
(58) Field of Search ..................... 369/112.01, 112.09, 369/44.23, 44.24, 112.14, 112.2, 112.22, 112.23, 112.28

(56) References Cited

U.S. PATENT DOCUMENTS 6,343,059 B1 * 1/2002 Lee et al. .............. 369/112.28

OTHER PUBLICATIONS

M. Tadeda et al, Technical Digest, pp. 186–187 (Oct. 20–22, 1998).

* cited by examiner

*Primary Examiner*—Nabil Hindi
(74) *Attorney, Agent, or Firm*—Birch, Stewart, Kolasch & Birch, LLP

(57) ABSTRACT

In a light transmission system for transmitting a light beam with a variation of wavelength from a light source to a light receiver, comprising, an optical element for receiving the light beam and projecting the light beam, and a compensation optical element for receiving the light beam and projecting the light beam, the optical element and the compensation optical element are arranged optically in series between the light source and the light receiver, a deflection angle of the optical element changes in a first direction according to an increase of wavelength of the light beam, a compensating deflection angle of the compensation optical element changes in a second direction according to the increase of wavelength of the light beam, and the change of the deflection angle in the first direction is compensated by the change of the compensating deflection angle in the second direction so that a position on the light receiver at which position the light beam impinges is restrained from changing according to the increase of wavelength of the light beam.

27 Claims, 8 Drawing Sheets

LIGHT TRANSMISSION DEVICE AND APPARATUS INCLUDING LIGHT TRANSMISSION DEVICE

BACKGROUND OF THE INVENTION AND RELATED ART STATEMENT

The present invention relates to a light transmission system for transmitting a light beam of a variable wavelength from a light source to a light receiver, an apparatus for measuring a change in distance between an optical element and an object member movable with respect to each other by using the light transmission system, and an apparatus for exposing at least a part of a surface of the object member (for example, a recording medium) by using the light transmission system.

TECHNICAL DIJEST of INTERNATIONAL SYMPOSIUM ON OPTICAL MEMORY 1998 discloses on Pd-07 regarding Deep UV mastering using an all-solid-state 266 nm laser for an over 20 GB/layer capacity disk that a positional relationship between an objective lens and a recording disk is measured from a position on a light receiver at which position a first light beam projected through the objective lens to the recording disk and subsequently reflected by the recording disk is received by the light receiver, while a second light beam is projected through the objective lens to the recording disk to expose a surface of the recording disk.

OBJECT AND SUMMARY OF THE INVENTION

An object of the present invention is to provide a light transmission device for transmitting securely and efficiently a light beam with a variation of wavelength from a light source to a light receiver while restraining a position on the light receiver at which position the light beam impinges from changing according to the variation of wavelength of the light beam, an apparatus for measuring correctly irrespective of the variation of wavelength of the light beam a change in distance between an optical element and a surface of an object member movable relative to each other, and an apparatus for exposing securely irrespective of the variation of wavelength of the light beam at least apart of a surface oaf object member (for example, a recording medium).

A light transmission device for transmitting a light beam with a variation of wavelength from a light source to a light receiver, according to the present invention, comprises, an optical element for receiving the light beam and projecting the light beam wherein a deflection angle between the received light beam and the projected light beam varies according to the variation of wavelength of the light beam, and a compensation optical element for receiving the light beam and projecting the light beam wherein a compensating deflection angle between the received light beam and the projected light beam varies according to the variation of wavelength of the light beam, wherein the optical element and the compensation optical element are arranged optically in series between the light source and the light receiver (the light beam may proceed from the optical element to an object, and subsequently the light beam reflected by the object may return to the optical element to proceed further toward the light receiver), the deflection angle changes in a first direction according to an increase (decrease) of wavelength of the light beam, the compensating deflection angle changes in a second direction according to the increase (decrease) of wavelength of the light beam, and the change of the deflection angle in the first direction is compensated by the change of the compensating deflection angle in the second direction so that a position on the light receiver at which position the light beam impinges is restrained from changing according to the increase (decrease) of wavelength of the light beam.

Since the change of the deflection angle in the first direction at the optical element is compensated by the change of the compensating deflection angle in the second direction at the compensation optical element so that the position on the light receiver at which position the light beam impinges is restrained from changing according to the increase (decrease) of wavelength of the light beam, the light beam is transmitted securely and efficiently from the light source to the light receiver although the deflection angle of the optical element is changed according to the variation of wavelength of the light beam.

The optical element and the compensation optical element may be arranged in such a manner that the light beam r received by the optical element, the light beam projected by the optical element, the light beam received by the compensation optical element and the light beam projected by the compensation optical element proceed along an imaginary plane. The optical element may be a lens. The compensation optical element may be a prism, diffraction grating or lens.

It is effective for compensating the change of the deflection angle in the first direction at the optical element by the change of the compensating deflection angle in the second direction that the optical element and the compensation optical element are arranged in such a manner that on an imaginary plane to be traversed by the light beam with a predetermined angle between the imaginary plane and the light beam, a direction in which a position on the imaginary plane to be passed by the light beam is changed by the change of the deflection angle according to the increase (decrease) of wavelength of the light beam is opposite to a direction in which the position on the imaginary plane to be passed by the light beam is changed by the change of the compensating deflection angle according to the increase (decrease) of wavelength of the light beam.

It is preferable that the compensation optical element is arranged to receive the light beam projected by the optical element and to project the light beam toward the light receiver, that is, the compensation optical element is arranged at a downstream side of the optical element in a light beam proceeding direction.

It is effective for compensating the change of the deflection angle in the first direction at the optical element by the change of the compensating deflection angle in the second direction that a direction in which the position on the light receiver at which position the light beam impinges is changed according to the change of the deflection angle in the first direction is opposite to a direction in which the position on the light receiver at which position the light beam impinges is changed according to the change of the compensating deflection angle in the second direction.

It is effective for compensating the change of the deflection angle in the first direction at the optical element by the change of the compensating deflection angle in the second direction that the optical element and the compensation optical element are arranged in such a manner that the light beam received by the optical element, the light beam projected by the optical element, the light beam received by the compensation optical element and the light beam projected by the compensation optical element proceed along or on an imaginary plane, and the first direction is opposite to the second direction as seen in a proceeding direction of the light beam.

The optical element may be adapted to face to an object member, and the light beam projected by the optical element may be received by the light receiver after being reflected by the object member. When the optical element is a lens, the lens is arranged to prevent the light beam from proceeding along a symmetrical axis of the lens around which symmetrical axis the lens is substantially symmetrical, so that the deflection angle of the light beam at the optical element changes according to the change of wavelength of the light beam. The light transmission device may further comprise a supplemental lens arranged to convert the light beam projected by the light source to a convergent light to be received by the optical element. When the optical element and the object member are movable relative to each other, the optical element is arranged to prevent a direction in which the light beam proceeds from the optical element to the object member from being parallel to a direction in which the optical element and the object member are movable relative to each other, so that the position on the light receiver at which position the light beam impinges is changed in accordance with the mutual movement between the optical element and the object member or a change in distance therebetween.

The optical element may be movable to change the position on the light receiver at which position the light beam impinges in accordance with the movement of the optical element. At least one of refractive angle and diffractive angle of the light beam at the optical element and at least one of refractive angle and diffractive angle of the light beam at the compensation optical element may vary according to the variation of wavelength of the light beam. The lens of the compensation optical element may include a pair of a convex lens and a concave lens, the convex lens and the concave lens may be arranged in such a manner that the light beam projected by the concave lens is received by the convex lens, a curvature of a surface of the concave lens facing to the convex lens and a curvature of a surface of the convex lens facing to the concave lens are larger than a curvature of a surface of the convex lens from which the light beam is projected.

An apparatus for measuring a change in distance between an optical element and a surface of an object member movable relative to each other, according to the invention, comprises, a light source for generating a light beam with a variation of wavelength, a light receiver for receiving the light beam reflected by the surface to measure a change of a position on the light receiver at which position the light beam impinges corresponding to the change in distance between the optical element and the surface of the object member, and a compensation optical element for receiving the light beam and projecting the light beam wherein a compensating deflection angle between the received light beam and the projected light beam varies according to the variation of wavelength of the light beam, wherein the optical element is arranged to receive the light beam and project the light beam toward the surface of the object member, a deflection angle of the optical element between the received light beam and the projected light beam varies according to the variation of wavelength of the light beam, the optical element and the compensation optical element are arranged optically in series between the light source and the light receiver, the deflection angle changes in a first direction according to an increase of wavelength of the light beam, the compensating deflection angle changes in a second direction according to the increase of wavelength of the light beam, and the change of the deflection angle in the first direction is compensated by the change of the compensating deflection angle in the second direction so that the position on the light receiver at which position the light beam impinges is restrained from changing according to the increase of wavelength of the light beam.

Since the change of the deflection angle in the first direction at the optical element is compensated by the change of the compensating deflection angle in the second direction at the compensation optical element so that the position on the light receiver at which position the light beam impinges is restrained from changing according to the increase (decrease) of wavelength of the light beam, the change of the position on the light receiver at which position the light beam impinges corresponds correctly to the change in distance between the optical element and the surface of the object member although the deflection angle of the optical element is changed according to the variation of wavelength of the light beam, so that the distance between the optical element and the surface of the object member is correctly measured.

The optical element is arranged to prevent a direction in which the light beam proceeds from the optical element to the surface of the object member from being parallel to a direction in which the optical element and the surface of the object member are movable relative to each other, so that the position on the light receiver at which position the light beam impinges is changed in accordance with the mutual movement between the optical element and the object member or a change in distance therebetween. The change of the position on the light receiver at which position the light beam impinges may be a difference between a desired position on the light receiver (for example, a datum or reference position of the light receiver) and a position on the light receiver at which position the first light beam actually impinges.

A direction in which the position on the light receiver at which position the light beam impinges is changed according to the change of the deflection angle in the first direction is opposite to a direction in which the position on the light receiver at which position the light beam impinges is changed according to the change of the compensating deflection angle in the second direction, and/or the optical element and the compensation optical element are arranged in such a manner that on an imaginary plane to be traversed by the light beam with a predetermined angle between the imaginary plane and the light beam, a direction in which a position on the imaginary plane to be passed by the light beam is changed by the change of the deflection angle according to the increase (decrease) of wavelength of the light beam is opposite to a direction in which the position on the imaginary plane to be passed by the light beam is changed by the change of the compensating deflection angle according to the increase (decrease) of wavelength of the light beam, so that the change of the deflection angle in the first direction is compensated by the change of the compensating deflection angle in the second direction.

An apparatus for exposing at least a part of a surface of a object member, according to the present invention, comprises, a first light source for generating a first light beam with a variation of wavelength, a second light source for generating a second light beam, an optical element for receiving the first and second light beams and projecting the first and second light beams toward the surface of the object member, wherein the surface of the object member and the optical element are movable relative to each other, a deflection angle between the received first light beam and the projected first light beam varies according to the variation of wavelength of the first light beam, and the second light beam is focused on the at least a part of the surface of the object member by the optical element to expose the at least a part of the surface of the object member, a light receiver for receiving the first light beam reflected by the surface to measure a change of a position on the light receiver at which position the first light beam impinges corresponding to a change in distance between the optical element and the surface of the object member, a compensation optical element for receiving the first light beam and projecting the first light beam wherein a compensating deflection angle between the received first light beam and the projected first light beam varies according to the variation of wavelength of the first light beam, and an optical element positioner for moving the optical element relative to the surface of the object member on the basis of the measured change of the position on the light receiver at which position the first light beam impinges, wherein the optical element and the compensation optical element are arranged optically in series between the light source and the light receiver, the deflection angle changes in a first direction according to an increase of wavelength of the first light beam, the compensating deflection angle changes in a second direction according to the increase of wavelength of the first light beam, and the change of the deflection angle in the first direction is compensated by the change of the compensating deflection angle in the second direction so that the position on the light receiver at which position the first light beam impinges is restrained from changing according to the increase of wavelength of the first light beam.

Since the change of the deflection angle in the first direction at the optical element is compensated by the change of the compensating deflection angle in the second direction at the compensation optical element so that the position on the light receiver at which position the light beam impinges is restrained from changing according to the increase (decrease) of wavelength of the light beam, the change of the position on the light receiver at which position the light beam impinges corresponds correctly to the change in distance between the optical element and the surface of the object member although the deflection angle of the optical element is changed according to the variation of wavelength of the light beam, so that the distance between the optical element and the surface of the object member is correctly measured. Therefore, the optical element is moved on the basis of the correctly measured change of the distance between the optical element and the surface of the object member, the optical element is moved on the basis of the correctly measured change of the distance between the optical element and the surface of the object member to keep the distance between the optical element and the surface of the object member at a desirable value and/or to change the distance between the optical element and the surface of the object member to the desirable value, so that the second light beam is correctly focused on the surface of the object member to expose securely the at least a part of the surface of the object member.

The optical element is arranged to prevent a direction in which the light beam proceeds from the optical element to the surface of the object member from being parallel to a direction in which the optical element and the surface of the object member are movable relative to each other, so that the position on the light receiver at which position the light beam impinges is changed in accordance with the mutual movement between the optical element and the object member or a change in distance therebetween.

A direction in which the position on the light receiver at which position the light beam impinges is changed according to the change of the deflection angle in the first direction is opposite to a direction in which the position on the light receiver at which position the light beam impinges is changed according to the change of the compensating deflection angle in the second direction, and/or the optical element and the compensation optical element are arranged in such a manner that on an imaginary plane to be traversed by the light beam with a predetermined angle between the imaginary plane and the light beam, a direction in which a position on the imaginary plane to be passed by the light beam is changed by the change of the deflection angle according to the increase (decrease) of wavelength of the light beam is opposite to a direction in which the position on the imaginary plane to be passed by the light beam is changed by the change of the compensating deflection angle according to the increase (decrease) of wavelength of the light beam, so that the change of the deflection angle in the first direction is compensated by the change of the compensating deflection angle in the second direction.

The measured change of the position on the light receiver at which position the first light beam impinges may be a difference between a desired position on the light receiver and a position on the light receiver at which position the first light beam actually impinges, and the optical element positioner moves the optical element relative to the surface of the object member to decrease the difference. The desired position on the light receiver may correspond to a desired distance between the optical element and the surface of the object member.

It is effective for decreasing a positioning error value for focusing the second light beam on the surface of the object member that the variation of the deflection angle between the first light beam received by the optical element and the first light beam projected by the optical element is larger than a variation of a deflection angle between the second light beam received by the optical element and the second light beam projected by the optical element, and/or the variation of wavelength of the first light beam is larger than a variation of wavelength of the second light beam. When a wavelength of the second light beam is not more than 300 nm, the compensation of the first light beam by the compensation optical member is important.

DETAILED DESCRIPTION OF PREFERRED EMBODIMENTS

Figure 1:
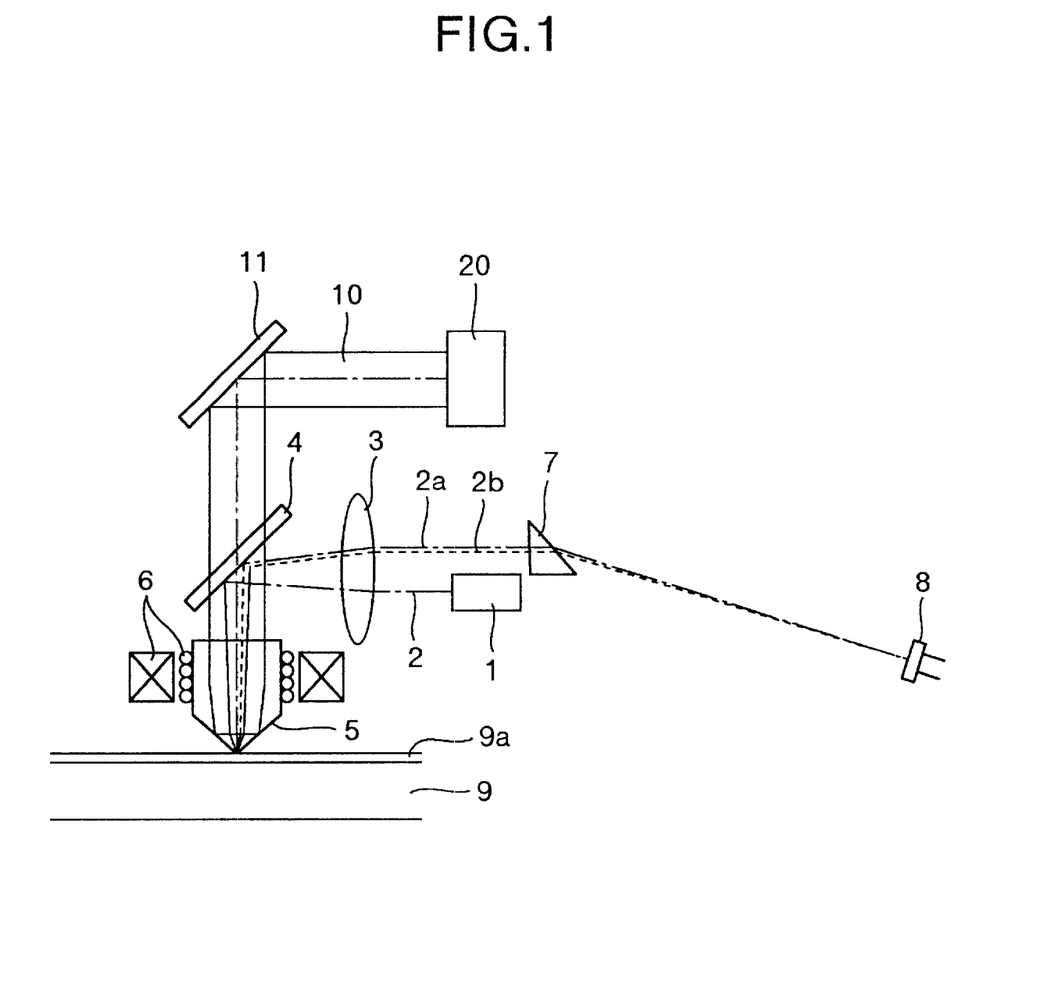
FIG. 1 is a schematic view showing an optical disk exposing apparatus as a first embodiment of the invention.

In an optical disk exposing apparatus of a first embodiment as shown in FIG. 1, an input optical system of a focus control light beam 2 includes a light source 1 for generating the focus control light beam 2, a compensating lens 3, a dichromic mirror 4, an objective lens 5 as the claimed optical element and an optical recording disk 9, and an output optical system of the focus control light beam 2 includes the optical recording disk 9, the objective lens 5, the dichromic mirror 4, the compensating lens 3, a chromatic aberration compensating prism 7 as the claimed compensating optical element for compensating a change in proceeding direction or course of the focus control light beam 2 at the objective lens 5 caused by a change in deflection degree or refractive index of the objective lens 5 according to a change in wave-length of the focus control light beam 2, and a light detector 8 as the claimed light receiver for receiving the focus control light beam 2 whose change in proceeding direction or course according to the change in wave-length of the focus control light beam 2 is compensated by the chromatic aberration compensating prism 7. An input optical system of an exposing light beam 10 includes a light source 20 for generating the exposing light beam 10, a mirror 11, the dichromic mirror 4, the objective lens 5 and an optical recording disk 9. The chromatic aberration compensating prism 7 has preferably a corner angle of about 30 degrees. A difference between a rate of the change in deflection degree or refractive index of the chromatic aberration compensating prism 7 with respect to the change in wave-length of the focus control light beam 2 and a rate of the change in deflection degree or refractive index of the objective lens 5 with respect to the change in wave-length of the focus control light beam 2 is preferably made as small as possible. However, by an appropriate optical system design, the rate of the change in deflection degree or refractive index of the chromatic aberration compensating prism 7 with respect to the change in wave-length of the focus control light beam 2, the rate of the change in deflection degree or refractive index of the objective lens 5 with respect to the change in wave-length of the focus control light beam 2, and distances between optical elements used in the optical disk exposing apparatus, distance measuring apparatus or light beam transmission device of the invention may be set variously to compensate the change in proceeding direction of the focus control light beam 2 caused by the change in wave-length of the focus control light beam 2. The chromatic aberration compensating prism 7 may be made of BSL, FPL, FSL, APL, NSL, ZSL or BAL series material of Ohara Inc., or of a quartz glass. The exposing light beam 10 maybe a laser light beam of wave-length not more than 300 nm for high recording density.

Figure 2:
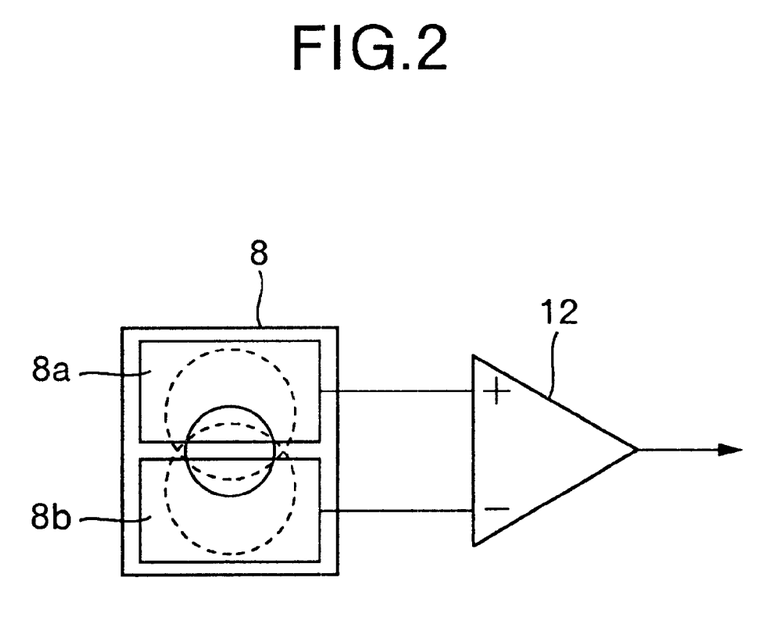
FIG. 2 is a schematic view showing a light detector usable in the optical disk exposing apparatus of the invention.

The light detector 8 includes, as shown in FIG. 2, a first light receiving surface 8a and a second light receiving surface 8b, and a signal corresponding to a difference between quantities of light received by the first and second light receiving surfaces 8a and 8b is output by a differential amplifier 12. A focus servo-actuator (for example, electro-magnetic servo-actuator) 6 drives the objective lens to decrease or minimize the difference between quantities of light.

The light detector 8 may include at least three light receiving surface in an array or at least two light receiving surface in each array.

The optical system of the focus control light beam 2 is set in such a manner that the focus control light beam 2 impinges at a central position between the first and second light receiving surfaces 8a and 8b to make the difference in quantities of light received by the first and second light receiving surfaces 8a and 8b substantially zero when the exposing light beam 10 is correctly focused on a photo-resist resin surface 9a of the optical recording disk 9 by the objective lens 5 positioned by the focus servo-actuator 6. When the objective lens 5 is unsuitably positioned to focus the exposing light beam 10 at an inside of the optical recording disk 9, the focus control light beam 2 impinges mainly on the first light receiving surface 8a so that the differential amplifier 12 generates a positive value of the signal corresponding to the difference between quantities of light received by the first and second light receiving surfaces 8a and 8b. When the objective lens 5 is unsuitably positioned to focus the exposing light beam 10 at an outside of the optical recording disk 9, the focus control light beam 2 impinges mainly on the second light receiving surface 8b so that the differential amplifier 12 generates a negative value of the signal corresponding to the difference between quantities of light received by the first and second light receiving surfaces 8a and 8b. By driving the focus servo-actuator 6 to make the value of the signal zero, the exposing light beam 10 is correctly focused on the surface 9a of the optical recording disk 9.

Figure 9:
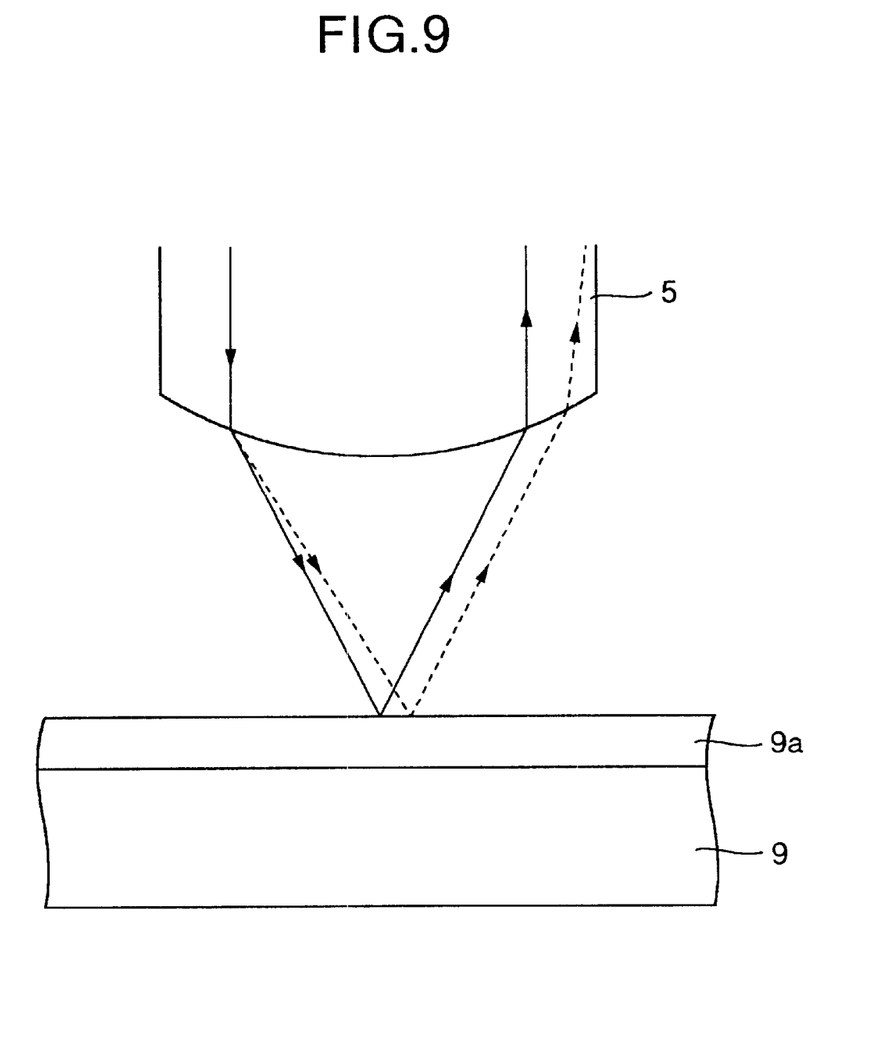
FIG. 9 is a schematic view showing a change in proceeding direction or course of a focus control light beam, caused by a change in deflection degree or refractive index of the objective lens according to a change in wave-length of the focus control light beam.

When the proceeding direction or course of the focus control light beam 2 is changed from a direction or course denoted by a solid line to a direction or course denoted by a broken line as shown in FIG. 9 by a change in deflection degree or index of refraction of the objective lens 5 according to a change in wave-length of the focus control light beam 2 caused by a change in luminous intensity of the focus control light beam 2 and/or a change of a temperature of the light beam source 1, the change of the proceeding direction or course of the focus control light beam 2 caused by the change in deflection degree or index of refraction of the objective lens 5 is compensated by the chromatic aberration compensating prism 7 whose deflection degree or index of refraction changes according to the change in wave-length of the focus control light beam 2, so that the position on the light detector 8 at which the focus control light beam 2 impinges is prevented from being changed by the change in deflection degree or index of refraction of the objective lens 5. Therefore, the exposing light beam 10 is correctly focused on the surface 9a of the optical recording disk 9 irrespective of the change in wave-length of the focus control light beam 2.

Figure 3A:
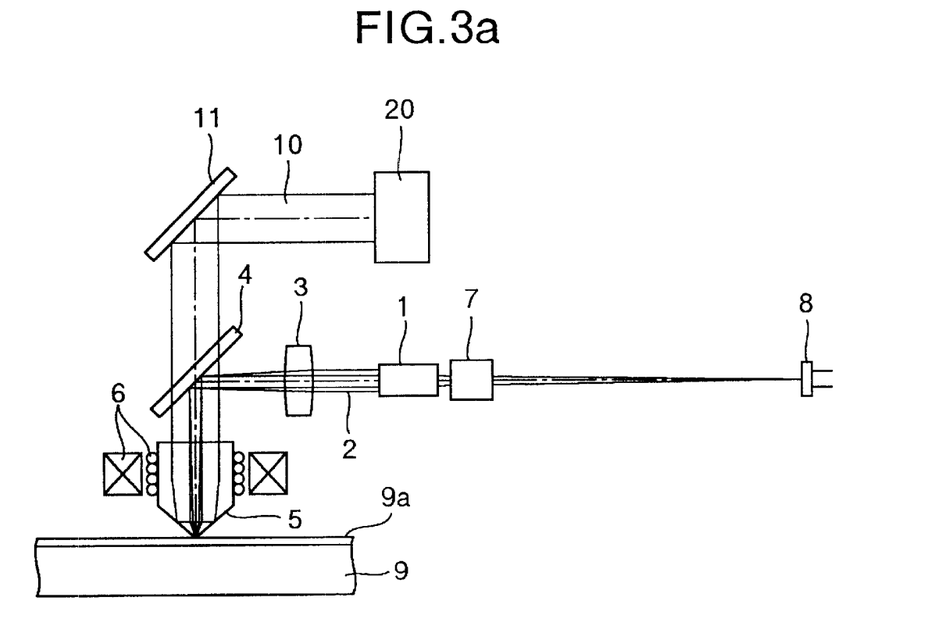
FIG. 3a is a schematic side view showing an optical disk exposing apparatus as a second embodiment of the invention.
Figure 3B:
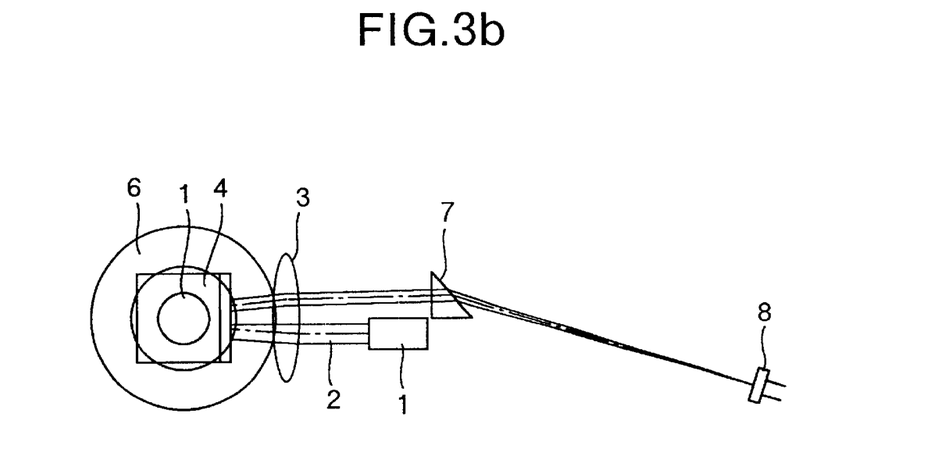
FIG. 3b is a schematic front view showing the optical disk exposing apparatus as the second embodiment of the invention.

As shown in FIGS. 3a and 3b, in a second embodiment of the invention, the light source 1 and the chromatic aberration compensating prism 7 may be horizontally separated away from each other. In FIG. 1, the light source 1 and the chromatic aberration compensating prism 7 may be vertically separated away from each other.

Figure 4:
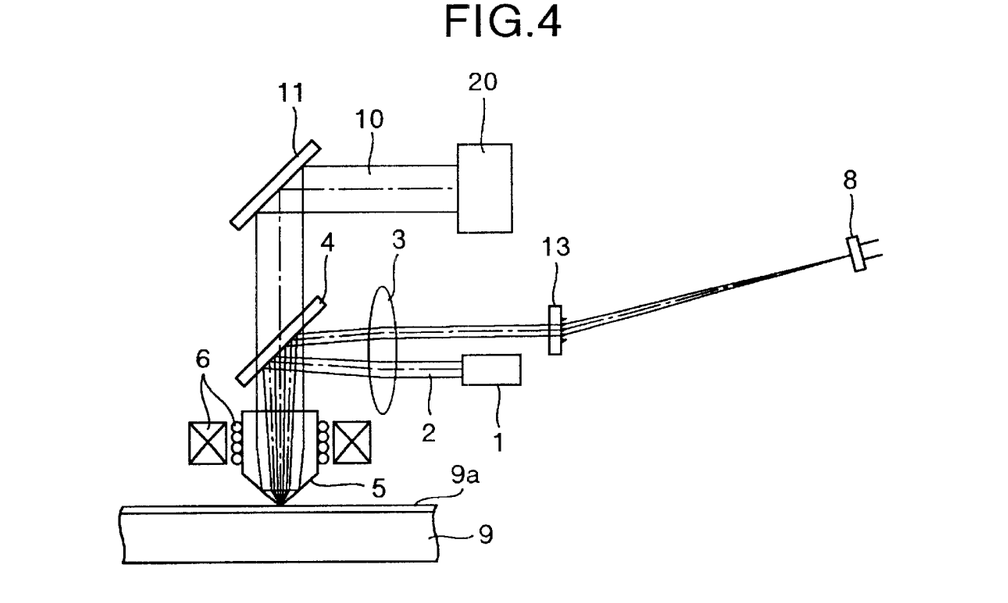
FIG. 4 is a schematic view showing an optical disk exposing apparatus as a third embodiment of the invention.

In an optical disk exposing apparatus of a third embodiment of the invention as shown in FIG. 4, a chromatic aberration compensating diffraction grating 13 is used, instead of the chromatic aberration compensating prism 7, as the claimed compensating optical element for compensating the change in proceeding direction or course of the focus control light beam 2 at the objective lens 5 caused by the change in deflection degree or refractive index of the objective lens 5 according to the change in wave-length of the focus control light beam 2.

The chromatic aberration compensating diffraction grating 13 includes preferably blazes for increasing a diffraction efficiency in a desired diffraction direction. It should be noted that a direction in which a diffraction angle of a diffraction grating increases according to an increase in wave-length of light is opposite to a direction in which a refraction angle of a lens or prism increases according to the increase in wave-length of light, because the diffraction angle of the diffraction grating decreases according to the increase in wave-length of light and the refraction angle of the lens or prism increases according to the increase in wave-length of light.

When the proceeding direction or course of the focus control light beam 2 is changed by the change in deflection degree or index of refraction of the objective lens 5 according to the change in wave-length of the focus control light beam 2, the change of the proceeding direction or course of the focus control light beam 2 caused by the change in deflection degree or index of refraction of the objective lens 5 is compensated by the chromatic aberration compensating diffraction grating 13 whose deflection degree or diffraction angle changes according to the change in wave-length of the focus control light beam 2, so that the position on the light detector 8 at which the focus control light beam 2 impinges is prevented from being changed by the change in deflection degree or index of refraction of the objective lens 5. Therefore, the exposing light beam 10 is correctly focused on the surface 9a of the optical recording disk 9 irrespective of the change in wave-length of the focus control light beam 2.

Figure 5:
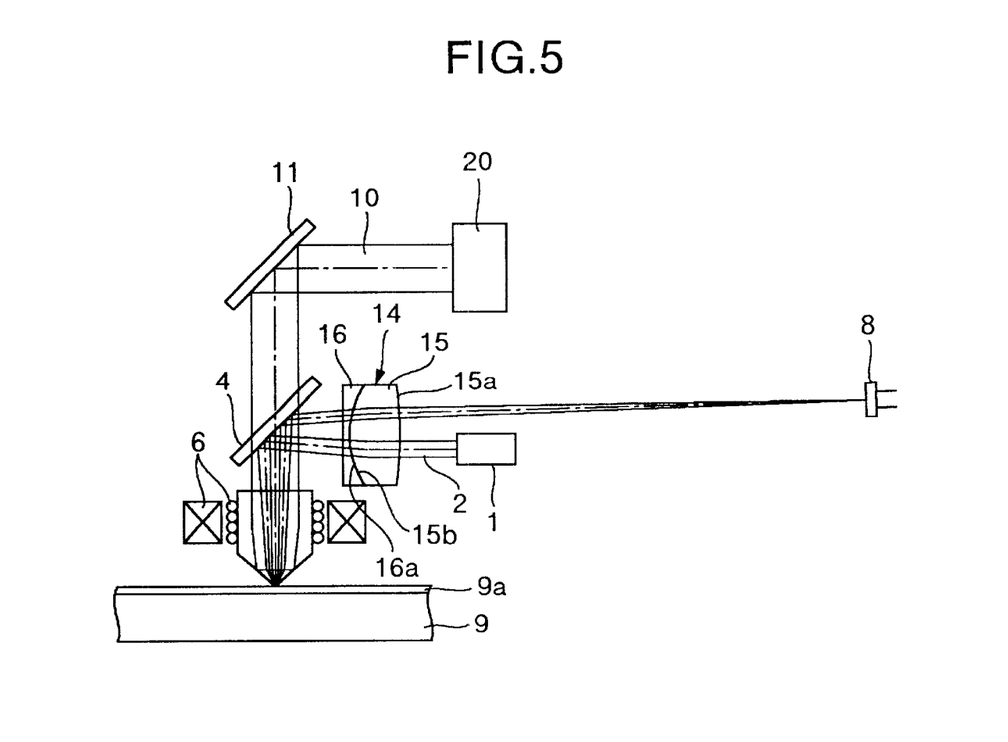
FIG. 5 is a schematic view showing an optical disk exposing apparatus as a fourth embodiment of the invention.

In an optical disk exposing apparatus of a fourth embodiment of the invention as shown in FIG. 5, a chromatic aberration compensating lens 14 is used, instead of the chromatic aberration compensating prism 7 and the chromatic aberration compensating diffraction grating 13, as the claimed compensating optical element for compensating the change in proceeding direction or course of the focus control light beam 2 at the objective lens 5 caused by the change in deflection degree or refractive index of the objective lens 5 according to the change in wave-length of the focus control light beam 2.

The chromatic aberration compensating lens 14 comprises a convex lens 15 and a concave lens 16. The convex lens 15 has a relatively small refractive index and a relatively small rate of change of the refractive index with respect to the change in wave length of the light, and maybe made of FPL, FSL or APL series material of Ohara Inc.,. The concave lens 16 has a relatively large refractive index and a relatively large rate of change of the refractive index with respect to the change in wave length of the light and may be made of BSM, PBM, PBH or TPH series material of Ohara Inc. A curvature of a first surface 15a of the convex lens 15 is smaller than a curvature of a second surface 15b of the convex lens 15 and a first surface 16a of the concave lens 16 to compensate the change in proceeding direction or course at the objective lens 4 according to the change in wave-length of the focus control light beam 2.

When the proceeding direction or course of the focus control light beam 2 is changed by the change in deflection degree or index of refraction of the objective lens 5 according to the change in wave-length of the focus control light beam 2, the change of the proceeding direction or course of the focus control light beam 2 caused by the change in deflection degree or index of refraction of the e objective lens 5 is compensated by the chromatic aberration compensating lens 14 whose deflection degree changes according to the change in wave-length of the focus control light beam 2, so that the position on the light detector 8 at which the focus control light beam 2 impinges is prevented from being changed by the change in deflection degree or index of refraction of the objective lens 5. Therefore, the exposing light beam 10 is correctly focused on the surface 9a of the optical recording disk 9 irrespective of the change in wave-length of the focus control light beam 2.

In the above described optical disk exposing apparatuses, the light source 1 is a semiconductor laser generator unit for generating the focus control light beam 2 of rated wave-length of 640 nm, the compensating lens 3 is a convex lens of focal distance of 100 mm, and the objective lens 5 has a focal distance of about 2 mm and a lens NA of 0.9. The light source 20 may be any type of laser generator, however, the light source 20 is preferably a gas laser generator or a solid-state laser generator for generating the exposing light beam 10 of wave-length not more than 300 nm to realize a high-density recording. The chromatic aberration compensating prism 7 may have a corner angle of about 30 degrees and be made of BSL-7 material of Ohara Inc.

In the first embodiment, the focus control light beam 2 of beam diameter of about 1.5 mm generated by the light source 1 proceeds into the compensating lens 3 with a certain distance relative to a lens optical axis to be converted a slightly converging light beam. The slightly converging light beam as the focus control light beam 2 is reflected by the dichromic mirror 4, focused on the optical recording disk 9 by the objective lens 5, and reflected by the optical recording disk 9, and reaches the light detector 8 through the compensating lens 3 and the chromatic aberration compensating prism 7 arranged away from the light detector 8 by about 100 mm.

Figure 6:
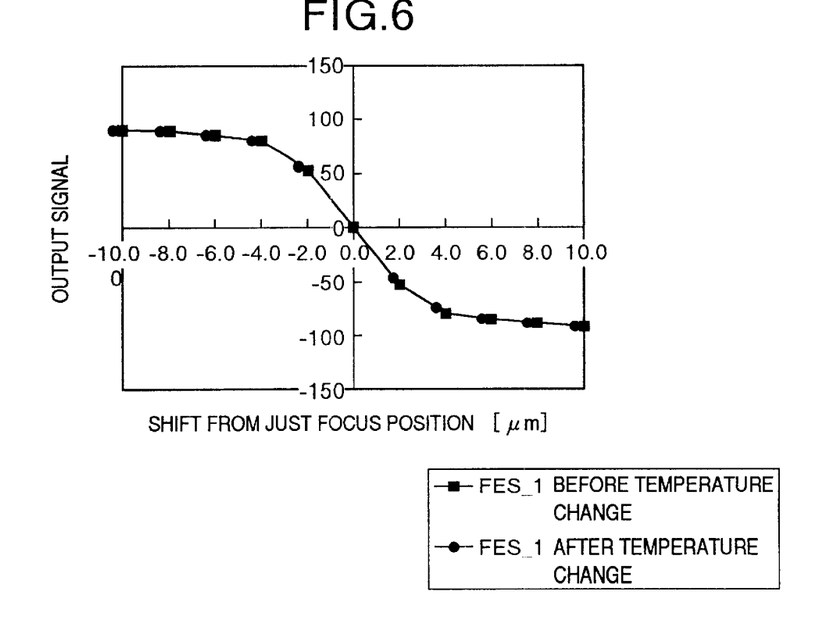
FIG. 6 is a diagram showing an experimental result of a relationship among a degree or value of an output signal of a light receiver according to a position on the light receiver at which position alight beam is received, a temperature change of a light source (corresponding to a change in wave-length of the light beam), a difference between an actual position of an objective lens and a just focus position of the objective lens at which just focus position the light beam is correctly focused on a surface of a recording disk by the objective lens, obtained with a compensation of a compensating optical element.

As shown in FIG. 6, by the chromatic aberration compensating prism 7, the chromatic aberration compensating diffraction grating 13 or the chromatic aberration compensating lens 14 as the claimed compensating optical element, a relationship between a difference between a just focus position of the objective lens 5 at which just focus position the exposing light beam 10 is correctly focused on a surface of the recording disk 9 by the objective lens 5 and an actual position of the objective lens 5 and a degree or value of an output signal of the light detector 8 is prevented from being changed by a change of a temperature of the light source 1 causing a change in wave-length of the focus control light beam 2.

Figure 7:
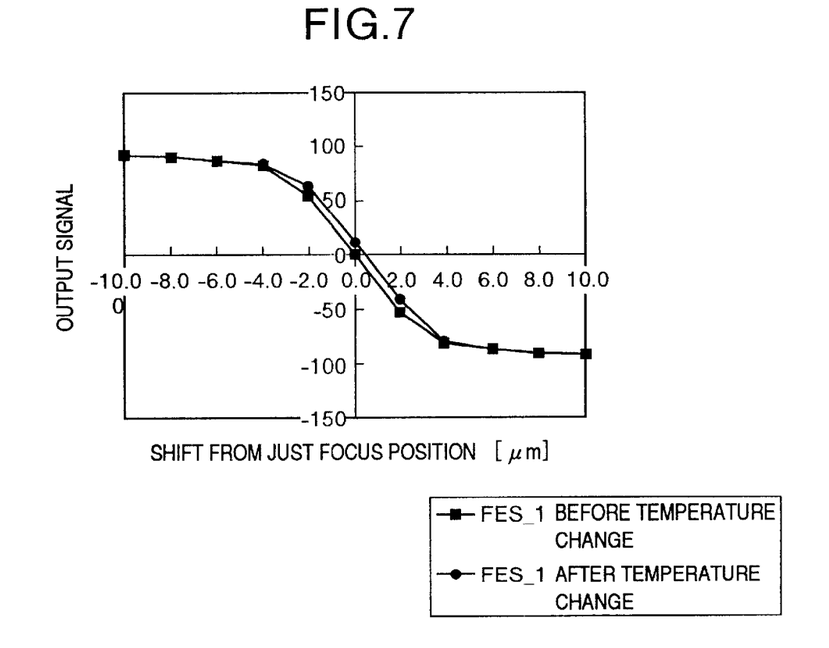
FIG. 7 is a diagram showing an experimental result of a relationship among a degree or value of an output signal of a light receiver according to a position on the light receiver at which position a light beam is received, a temperature change of a light source (corresponding to a change in wave-length of the light beam), a difference between an actual position of an objective lens and a just focus position of the objective lens at which just focus position the light beam is correctly focused on a surface of a recording disk by the objective lens, obtained without the compensation of the compensating optical element.

As shown in FIG. 7, when the chromatic aberration compensating prism 7, the chromatic aberration compensating diffraction grating 13 and the chromatic aberration compensating lens 14 as the claimed compensating optical element are not used, the relationship between the difference between the just focus position of the objective lens 5 and the actual position of the objective lens 5 and the degree or value of the output signal of the light detector 8 is changed by the change of the temperature of the light source 1 causing a change in wave-length of the focus control light beam 2.

A variation of the degree or value of the output signal of the light detector 8 caused by a variation in luminous intensity of the focus control light beam 2 may be restrained by incorporating so-called AGC circuit into the light detector 8. The AGC circuit generates the output signal of the light detector 8 in proportion to a ratio of the quantity of light received on of the first and second light receiving surfaces 8a and 8b with respect to a total amount of the quantities of light received by the first and second light receiving surfaces 8a and 8b.

Figure 10:
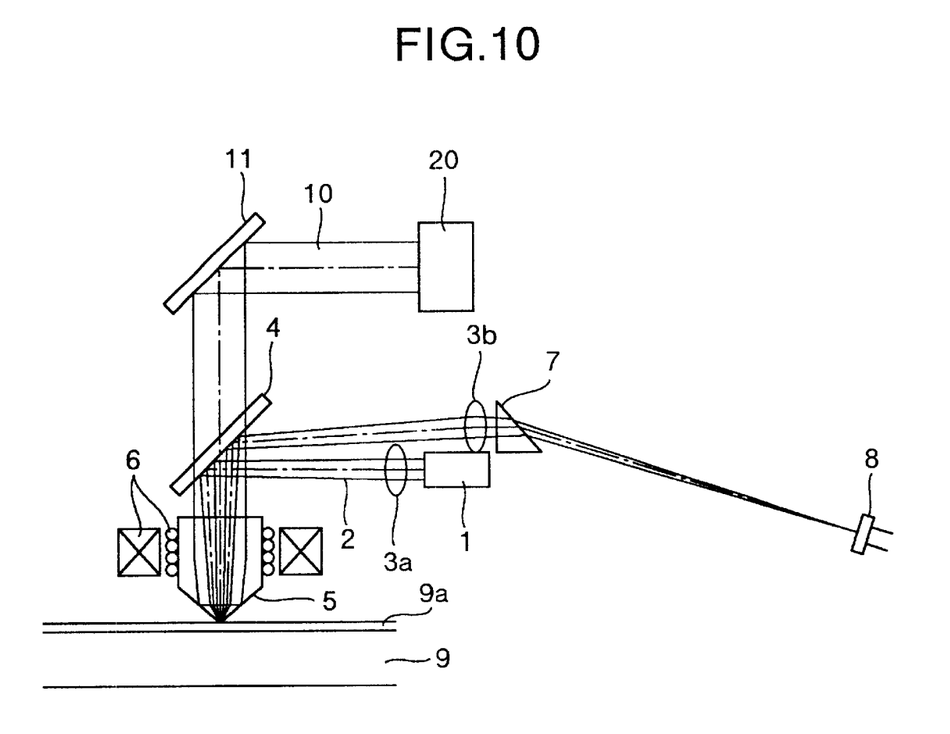
FIG. 10 is a schematic view showing an optical disk exposing apparatus as a fifth embodiment of the invention.

In an optical disk exposing apparatus of a fifth embodiment of the invention as shown in FIG. 10, a first compensating lens 3a converts the focus control light beam 2 proceeding toward the objective lens 5 to a converging light beam, and a second compensating lens 3b converts the focus control light beam 2 proceeding from the objective lens 5 toward the light detector 8 to a converging light beam.

Figure 8:
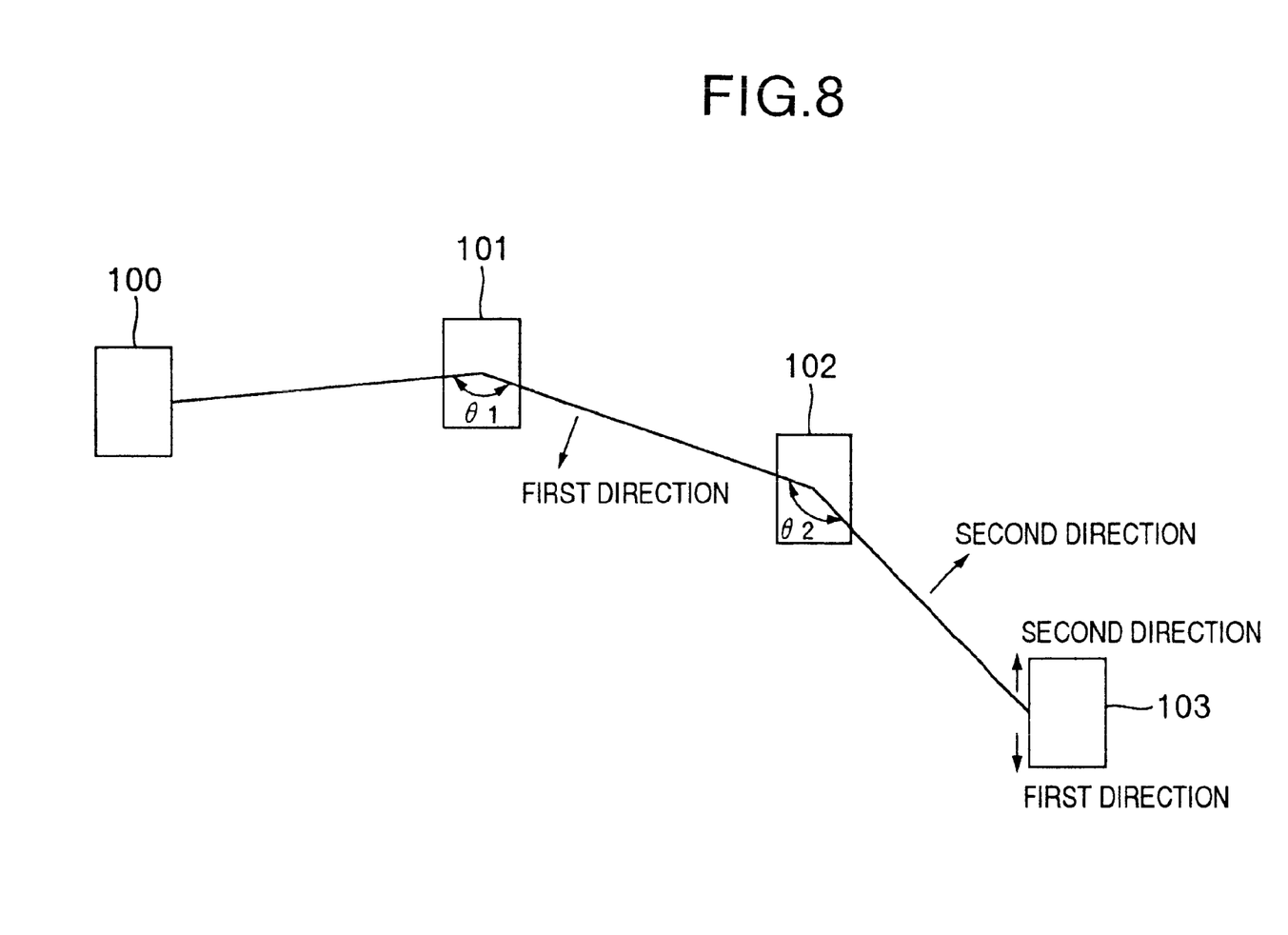
FIG. 8 is a schematic view showing a light transmission device of the invention.

In a light transmission device usable in a distance change measuring device to be incorporated into the optical disk exposing apparatus, as shown in FIG. 8, a light beam may be transmitted from a light source 100 to a light receiver or detector 103 through an optical element 101 as the claimed optical element and a compensating optical element 102 as the claimed compensating optical element without a reflection on a object member. The light receiver 103 maybe a simple light detector for generating an output signal corresponding to On-Off of the light beam received by the light receiver 103. A deflection angle θ1 of the optical element 101 changes in a first direction according to a variation (one of increase and decrease) of wave-length of the light beam, and a deflection angle θ2 of the compensating optical element 102 changes in a second direction according to the variation (the one of increase and decrease) of wave-length of the light beam. A direction in which a position on the light receiver 103 at which the light beam impinges is changed by the change of the deflection angle θ1 of the optical element 101 is opposite to a direction in which a position on the light receiver 103 at which the light beam impinges is changed by the change of the deflection angle θ2 of the compensating optical element 102 to compensate the change of the deflection angle θ1 of the optical element 101 with the change of the deflection angle θ2 of the compensating optical element 102, so that the position on the light receiver 103 at which the light beam impinges is restrained from changing according to the variation (the one of increase and decrease) of wave-length of the light beam to be transmitted from the light source 100 to the light receiver 103.

What is claimed is:

1. A light transmission device for transmitting a light beam with a variation of wavelength f from a light source to a light receiver, comprising, an optical element for receiving the light beam and projecting the light beam wherein a deflection angle between the received light beam and the projected light beam varies according to the variation of wavelength of the light beam, and a compensation optical element for receiving the light beam and projecting the light beam wherein a compensating deflection angle between the received light beam and the projected light beam varies according to the variation of wavelength of the light beam, wherein the optical element and the compensation optical element are arranged optically in series between the light source and the light receiver, the deflection angle changes in a first direction according to an increase of wavelength of the light beam, the compensating deflection angle changes in a second direction according to the increase of wavelength of the light beam, and the change of the deflection angle in the first direction is compensated by the change of the compensating deflection angle in the second direction so that a position on the light receiver at which position the light beam impinges is restrained from changing according to the increase of wavelength of the light beam.

2. A light transmission device according to claim 1, wherein the optical element and the compensation optical element are arranged in such a manner that the light beam received by the optical element, the light beam projected by the optical element, the light beam received by the compensation optical element and the light beam projected by the compensation optical element proceed along an imaginary plane.

3. A light transmission device according to claim 1, wherein the optical element is a lens.

4. A light transmission device according to claim 1, wherein the compensation optical element is a prism.

5. A light transmission device according to claim 1, wherein the compensation optical element is a diffraction grating.

6. A light transmission device according to claim 1, wherein the compensation optical element is a lens.

7. A light transmission device according to claim 1, wherein the optical element and the compensation optical element are arranged in such a manner that on an imaginary plane to be traversed by the light beam with a predetermined angle between the imaginary plane and the light beam, a direction in which a position on the imaginary plane to be passed by the light beam is changed by the change of the deflection angle according to the increase of wavelength of the light beam is opposite to a direction in which the position on the imaginary plane to be passed by the light beam is changed by the change of the compensating deflection angle according to the increase of wavelength of the light beam.

8. A light transmission device according to claim 1, wherein the compensation optical element is arranged to receive the light beam projected by the optical element and to project the light beam toward the light receiver.

9. A light transmission device according to claim 1, wherein a direction in which the position on the light receiver at which position the light beam impinges is changed according to the change of the deflection angle in the first direction is opposite to a direction in which the position on the light receiver at which position the light beam impinges is changed according to the change of the compensating deflection angle in the second direction.

10. A light transmission device according to claim 1, wherein the optical element and the compensation optical element are arranged in such a manner that the light beam received by the optical element, the light beam projected by the optical element, the light beam received by the compensation optical element and the light beam projected by the compensation optical element proceed along an imaginary plane, and the first direction is opposite to the second direction as seen in a proceeding direction of the light beam.

11. A light transmission device according to claim 1, wherein the optical element is adapted to face to an object member, and the light beam projected by the optical element is received by the light receiver after being reflected by the object member.

12. A light transmission device according to claim 11, wherein the optical element is a lens arranged to prevent the light beam from proceeding along a symmetrical axis of the lens around which symmetrical axis the lens is substantially symmetrical.

13. A light transmission device according to claim 11, further comprising a supplemental lens arranged to convert the light beam projected by the light source to a convergent light to be received by the optical element.

14. A light transmission device according to claim 11, wherein the optical element and the object member are movable relative to each other, and the optical element is arranged to prevent a direction in which the light beam proceeds from the optical element to the object member from being parallel to a direction in which the optical element and the object member are movable relative to each other.

15. A light transmission device according to claim 1, wherein the optical element is movable to change the position on the light receiver at which position the light beam impinges in accordance with the movement of the optical element.

16. A light transmission device according to claim 1, wherein at least one of refractive angle and diffractive angle of the light beam at the optical element and at least one of refractive angle and diffractive angle of the light beam at the compensation optical element varies according to the variation of wavelength of the light beam.

17. A light transmission device according to claim 6, wherein the lens includes a pair of a convex lens and a concave lens, the convex lens and the concave lens are arranged in such a manner that the light beam projected by the concave lens is received by the convex lens, a curvature of a surface of the concave lens facing to the convex lens and a curvature of a surface of the convex lens facing to the concave lens are larger than a curvature of a surface of the convex lens from which the light beam is projected.

18. An apparatus for measuring a change in distance between an optical element and a surface of an object member movable relative to each other, comprising, a light source for generating a light beam with a variation of wavelength, a light receiver for receiving the light beam reflected by the surface to measure a change of a position on the light receiver at which position the light beam impinges corresponding to the change in distance between the optical element and the surface of the object member, and a compensation optical element for receiving the light beam and projecting the light beam wherein a compensating deflection angle between the received light beam and the projected light beam varies according to the variation of wavelength of the light beam, wherein the optical element is arranged to receive the light beam and projecting the light beam toward the surface of the object member, a deflection angle of the optical element between the received light beam and the projected light beam varies according to the variation of wavelength of the light beam, the optical element and the compensation optical element are arranged optically in series between the light source and the light receiver, the deflection angle changes in a first direction according to an increase of wavelength of the light beam, the compensating deflection angle changes in a second direction according to the increase of wavelength of the light beam, and the change of the deflection angle in the first direction is compensated by the change of the compensating deflection angle in the second direction so that the position on the light receiver at which position the light beam impinges is restrained from changing according to the increase of wavelength of the light beam.

19. An apparatus according to claim 18, wherein the optical element is arranged to prevent a direction in which the light beam proceeds from the optical element to the surface of the object member from being parallel to a direction in which the optical element and the surface of the object member are movable relative to each other.

20. An apparatus according to claim 18, wherein a direction in which the position on the light receiver at which position the light beam impinges is changed according to the change of the deflection angle in the first direction is opposite to a direction in which the position on the light receiver at which position the light beam impinges is changed according to the change of the compensating deflection angle in the second direction.

21. An apparatus for exposing at least a part of a surface of a object member, comprising, a first light source for generating a first light beam with a variation of wavelength, a second light source for generating a second light beam, an optical element for receiving the first and second light beams and projecting the first and second light beams toward the surface of the object member, wherein the surface of the object member and the optical element are movable relative to each other, a deflection angle between the received first light beam and the projected first light beam varies according to the variation of wavelength of the first light beam, and the second light beam is focused on the at least apart of the surface of the object member by the optical element to expose the at least a part of the surface of the object member, a light receiver for receiving the first light beam reflected by the surface to measure a change of a position on the light receiver at which position the first light beam impinges corresponding to a change in distance between the optical element and the surface of the object member, a compensation optical element for receiving the first light beam and projecting the first light beam wherein a compensating deflection angle between the received first light beam and the projected first light beam varies according to the variation of wavelength of the first light beam, and an optical element positioner for moving the optical element relative to the surface of the object member on the basis of the measured change of the position on the light receiver at which position the first light beam impinges, wherein the optical element and the compensation optical element are arranged optically in series between the light source and the light receiver, the deflection angle changes in a first direction according to an increase of wavelength of the first light beam, the compensating deflection angle changes in a second direction according to the increase of wavelength of the first light beam, and the change of the deflection angle in the first direction is compensated by the change of the compensating deflection angle in the second direction so that the position on the light receiver at which position the first light beam impinges is restrained from changing according to the increase of wavelength of the first light beam.

22. An apparatus according to claim 21, wherein the optical element is arranged to prevent a direction in which the first light beam proceeds from the optical element to the surface of the object member from being parallel to a direction in which the optical element and the surface of the object member are movable relative to each other.

23. An apparatus according to claim 21, wherein a direction in which the position on the light receiver at which position the first light beam impinges is changed according to the change of the deflection angle in the first direction is opposite to a direction in which the position on the light receiver at which position the first light beam impinges is changed according to the change of the compensating deflection angle in the second direction.

24. An apparatus according to claim 21, wherein the measured change of the position on the light receiver at which position the first light beam impinges is a difference between a desired position on the light receiver and a position on the light receiver at which position the first light beam actually impinges, and the optical element positioner moves the optical element relative to the surface of the object member to decrease the difference.

25. An apparatus according to claim 21, wherein the variation of the deflection angle between the first light beam received by the optical element and the first light beam projected by the optical element is larger than a variation of a deflection angle between the second light beam received by the optical element and the second light beam projected by the optical element.

26. An apparatus according to claim 21, wherein the variation of wavelength of the first light beam is larger than a variation of wavelength of the second light beam.

27. An apparatus according to claim 21, wherein a wavelength of the second light beam is not more than 300 nm.

* * * * *